Geo. W. Shade's Improved Hay Fork.

72232

PATENTED
DEC 17 1867

Witnesses.
Thos. Cromwell
A. Barber

Inventor.
Geo. W. Shade
By his Atty
T. W. A. McPherson

United States Patent Office.

GEORGE W. SHADE, OF SHIPPENSBURG, PENNSYLVANIA.

Letters Patent No. 72,232, dated December 17, 1867.

---

IMPROVEMENT IN HORSE HAY-FORKS.

---

The Schedule referred to in these Letters Patent and making part of the same.

---

TO ALL WHOM IT MAY CONCERN:

Be it known that I, GEORGE W. SHADE, of Shippensburg, county of Cumberland, and State of Pennsylvania, have invented a new and improved Hay-Fork; and I do hereby declare that the following is a full, clear, and exact description thereof, which will enable others skilled in the art to make and use the same, reference being had to the accompanying drawings, forming a part of this specification, in which—

Similar letters of reference indicate corresponding parts.

Figure 1:
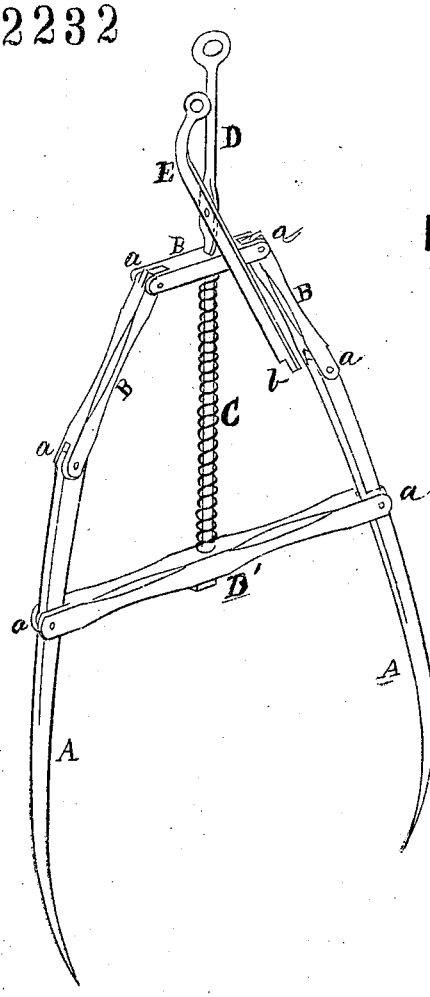
Figure 1 represents a view of the fork, as applied, ready to enter the hay
Figure 2:
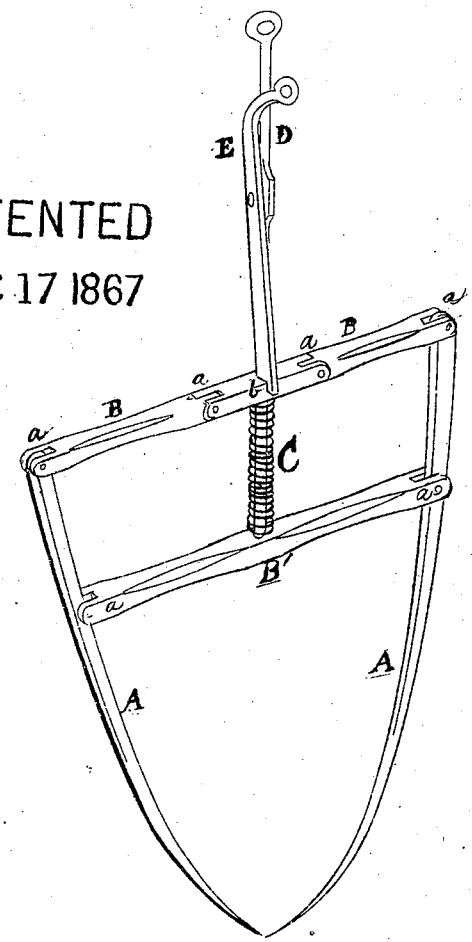
Figure 2 represents the fork shut and loaded with the hay.

This invention relates to new devices for loading and unloading hay, straw, or grain in sheaf or bundle, so that the same can be easily handled and carried to any place desired.

In the drawings, A represents the prongs or tines of the fork, made of strong wood, iron, steel, or any other suitable material, to which are attached bars B B', at convenient distances from each other, having toggle-joints $a$ at each end, and the upper or bar B having four of these toggle-joints, one at either end, where the bar is attached to the prongs, and one on either side of the handle D. The handle D passes through the bars B B', to the lower of which, B', it is attached in any convenient way. Between the bars B B' I insert a spiral spring, C. This spring may be either spiral or of any other form, so as to serve for the purpose intended. A trip-rod, E, with a catch, $b$, at its lower end, is attached to the handle D, by means of a rivet, so as to allow free motion. Through the holes in handle D and trip-rod E a rope is placed, by means of which the trip-rod is operated.

The fork thus constructed is operated as follows: When the prongs stand apart, as represented in fig. 1, they are ready to enter the hay, when, by pressing down with the foot upon the upper bar B, the prongs operated by the toggle-joints are brought together upon the hay. The catch at the end of the trip-rod E is then pushed down on the upper bar B, and the prongs are thus firmly secured upon the hay. The fork thus loaded is then carried to the mow or other place for storing the hay, when, by pulling the trip-rope, the catch on the rod E is released from its hold on the bar, the prongs are opened, and the hay allowed to fall wherever desired, the spring, in conjunction with the weight of the hay, throwing the tines apart when the trip-rod is unlocked.

I do not confine myself to the use of one pair of prongs, as any number of pairs can be used and operated upon the same principle.

Having thus described my invention, what I desire to secure by Letters Patent, is—

A hay-fork, constructed in the manner substantially as described, with one or more pairs of prongs, in combination with bars B B', toggle-joints $a$, spring C, handle D, and trip-catch E, all operating in the manner as and for the purpose set forth.

GEORGE W. SHADE.

Witnesses:
    J. W. McPHERSON,
    J. O. M. BUTTS.